United States Patent [19]

Tsitsichvili

[11] Patent Number: 4,793,962
[45] Date of Patent: Dec. 27, 1988

[54] PROCESS FOR PLACING A BUNDLE OF RODS OF A NUCLEAR FUEL ASSEMBLY INTO A CASE AND INSTALLATION FOR PERFORMING THIS PROCESS

[75] Inventor: Jean Tsitsichvili, Issy Les Moulineaux, France

[73] Assignee: Cogema Compagnie Generale Des Matieres Nucleaires, France

[21] Appl. No.: 29,726

[22] Filed: Mar. 24, 1987

[30] Foreign Application Priority Data

Apr. 1, 1986 [FR] France .................... 86 04584

[51] Int. Cl.$^4$ .................................. G21C 19/33
[52] U.S. Cl. .................... 376/261; 376/272; 29/723; 414/146
[58] Field of Search ............ 376/261, 272; 414/146, 414/404, 417, 745; 29/400 N, 723, 244

[56] References Cited

U.S. PATENT DOCUMENTS

| 4,446,098 | 5/1984 | Pomaibo et al. | 376/261 |
| 4,547,117 | 10/1985 | Shields | 376/272 |
| 4,625,396 | 12/1986 | Ahmed et al. | 29/400 N |
| 4,636,351 | 1/1987 | Rohr | 376/272 |
| 4,649,632 | 3/1987 | Schoenig, Jr. et al. | 29/723 |
| 4,650,640 | 3/1987 | Lahr et al. | 376/261 |
| 4,659,536 | 4/1987 | Baudro | 376/261 |
| 4,671,921 | 6/1987 | Foussard | 376/261 |
| 4,673,544 | 7/1987 | Rohr | 376/261 |
| 4,683,110 | 7/1987 | Baudro et al. | 376/261 |
| 4,704,247 | 11/1987 | Wachter | 376/261 |
| 4,723,359 | 2/1988 | Blissell et al. | 376/261 |

FOREIGN PATENT DOCUMENTS

| 0066695 | 12/1982 | European Pat. Off. | |
| 0140025 | 5/1985 | European Pat. Off. | |
| 0164510 | 12/1985 | European Pat. Off. | |
| 3506584 | 8/1986 | Fed. Rep. of Germany | 376/261 |

Primary Examiner—Deborah L. Kyle
Assistant Examiner—Daniel Wasil

[57] ABSTRACT

In order to transfer a bundle of rods of or from a nuclear fuel assembly into a storage case, the bundle is placed in a waiting position above a cassette provided with recesses. The rods are then introduced into the recesses by lowering them by gravity. When the cassette is full, it is brought into the extension of the case by interposing a transformation member. By simultaneously exerting a thrust on all the rods, the latter are compactly transferred into the case.

14 Claims, 11 Drawing Sheets

PROCESS FOR PLACING A BUNDLE OF RODS OF A NUCLEAR FUEL ASSEMBLY INTO A CASE AND INSTALLATION FOR PERFORMING THIS PROCESS

BACKGROUND OF THE INVENTION

The invention relates to a process for placing a bundle of rods arranged in the form of a square pitch spacing lattice in a nuclear fuel assembly in a case. The invention also also relates to an installation for performing this process.

In nuclear reactors, particularly of the pressurized water type, the fissile material is constituted by fritted uranium dioxide ($UO_2$) pellets, which are stacked in metal cans for forming fuel rods. The fuel rods are themselves arranged in bundles in accordance with a square spacing lattice in nuclear fuel assemblies, which are then juxtaposed for forming the reactor core.

Figure 1:
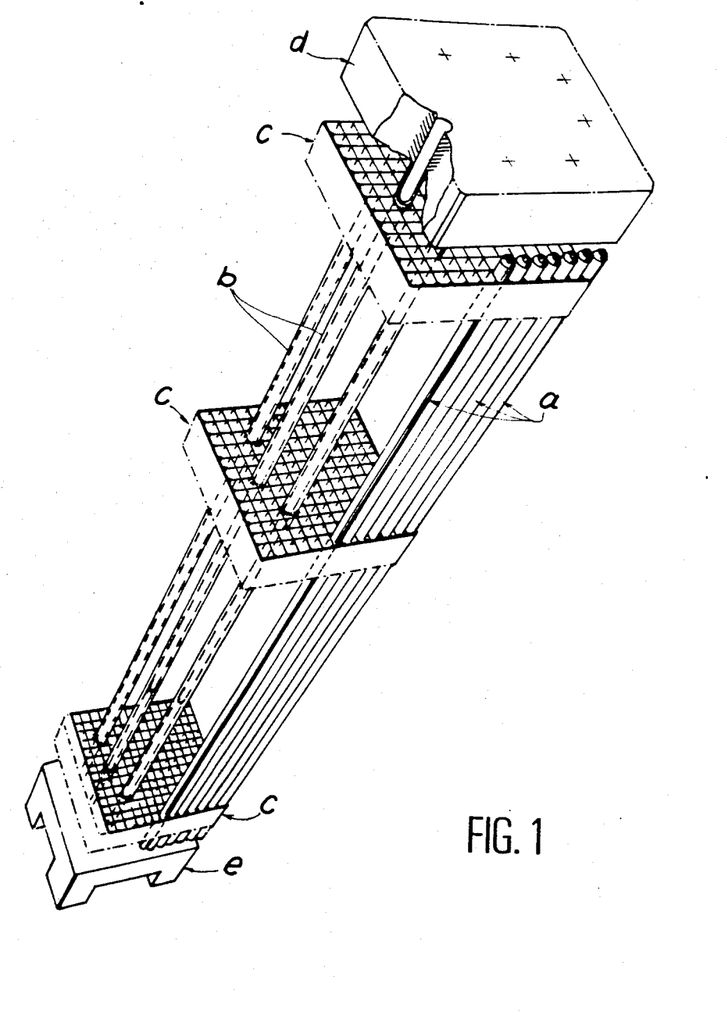
FIG. 1, already described, a perspective view showing in diagrammatic and fragmentary manner a nuclear fuel assembly of a pressurized water nuclear reactor.

FIG. 1 is a perspective view diagrammatically showing a nuclear fuel assembly. Apart from the bundle of rods a, it comprises a certain number of guide tubes b occupying the space of certain rods a in the square pitch or spacing lattice. In order to clarify the drawing, only some rods and some guide tubes are shown. Most of the guide tubes are used for slidingly guiding the absorbing rods of the not shown control groups.

The relative positioning between the rods and the tubes is ensured by spacing grids c, of which there are generally eight and whereof only three are shown in FIG. 1. These grids constitute the framework of the assembly.

The assembly also comprises two end pieces constituted by an upper fitting d and a lower fitting e, said fittings being respectively used for the handling of the assembly and the fixing thereof in the reactor core. They are fixed to the ends of the guide tubes b.

When such an assembly has been irradiated in the nuclear reactor core, it has to be dismantled to enable the fuel to be removed.

A first stage in the dismantling of assemblies consists of cutting up the guide tube b at a level below that of the upper end of the rods a, so as to give access to said rod end, following the removal of the upper fitting d from the upper grid and the parts of the guide tubes attached thereto. During a second stage, rods a are grasped by their ends, so as to be extracted from the remainder of the framework of the assembly.

When the rods have been extracted, the actual dismantling is completed and the rods are generally stored in a pool to enable their activity to decay. For this purpose they are placed in cases. The invention specifically relates to a process and installation making it possible to place the bundle of rods in a case following the extraction thereof.

When the decay in the activity of the nuclear fuel contained in the rods is considered to be adequate, the latter are cut and the fuel contained therein is dissolved prior to removal.

The function of placing the rods in the case prior to the storage thereof serves to reduce to the maximum the overall dimensions of the rods stored, whilst making it easily possible to manage said rods. To this end, all information concerning the life of the rods (irradiation time in the reactor, date of placing in the case, etc) generally appear on the case. The operation of placing the rods in the case must consequently make it possible to occupy in an optimum manner the internal volume of the cases.

In the present state of the art, said operation is performed by introducing each of rods vertically into an individual guide, whose diameter decreases towards the bottom, the lower ends of the guides also approaching one another towards to the bottom, above the vertically positioned case to be filled.

However, installations of this type suffer from the disadvantage of making it necessary to individually push on each of these rods, which is very difficult to carry out, in view of the deformations of some of these after irradiation. Moreover, the passage of each of the rods into an individual guide having at its lower end a diameter which is scarcely larger than the nominal diameter of the rods leads to a risk of the latter jamming, due to their swelling under irradiation.

In EP-A-0 06695, the rods are moved together by means of a complex device, within which the rods are vertically pushed. This device is in three parts successively ensuring the shape change of the bundle, the moving together of the rods contained in each row and then the moving together of the rows of rods. However, the first part of this device has individual guide tubes into which the rods pass, so that the aforementioned disadvantages still exist.

The present invention relates to a process and installation for placing in a case a bundle of rods, whilst eliminating any risk of these rods jamming and whilst still ensuring a completely effective filling of the cases.

SUMMARY OF THE INVENTION

The present invention more specifically relates to a process for placing in a case a bundle of rods arranged in n parallel rows of at least r rods, in accordance with a square pitch lattice in a nuclear fuel assembly, wherein it comprises placing the bundle of rods horizontally in accordance with said lattice in a waiting position above a cassette having p recesses separated by partitions, p being an integer at least equal to n, so that each row of rods is located above a recess in the cassette, introducing the rods into the cassette recesses, placing the cassette in the horizontal extension of a case, by interposing between cassette and case a transformation member, whose width decreases progressively from cassette to case by a value equal to the cumulative thickness of the cassette partitions and transferring the rods from the cassette into the case through the transformation member by simultaneously pushing all the rods.

The essential originality of this process is based on the use of an intermediate cassette. By introducing the rods of the bundle into said cassette, the rods are moved together in a first direction of the square pitch lattice formed by the bundle. The transfer of the rods from the intermediate cassette into the case ensures the moving together of the rods in a second direction of said lattice, without it being necessary to use at any time an individual guide for each of the rods. During this transfer, the rods are constantly in contact with one another, so that to the thrust exerted on the rods is added a displacement by friction between adjacent rods.

To take account of the fact that in practice the number of rods in certain rows exceeds r, because the locations previously occupied by the guide tubes remain empty, use is made of a cassette, whereof each recess can contain at the most s rods, s being an integer at the most equal to r and having a number p of the recesses exceeding n, so that the product p·s is at least equal to the number of rods of the bundle and in that in order to introduce the rods into the recesses, after lowering s rods of each row into each of the n recesses positioned below the n rows of rods, a relative horizontal displacement takes place perpendicular to the rods between the cassette and the rods of the bundle not introduced into the aforementioned n recesses, called the remaining rods, in order to bring the (p-n) remaining recesses successively below each row of rods and to lower said remaining rods into said (p-n) recesses.

According to a preferred embodiment of the invention, the bundle of rods is positioned horizontally in the waiting position by maintaining the rods in accordance with the square pitch lattice by at least one set of horizontal combs or rakes and one set of vertical combs or rakes and the set of horizontal combs is retracted before introducing the rods into the cassette recesses.

Preferably, before placing the bundle of rods horizontally above the cassette, part of the assembly is eliminated to free one of the ends of the rods of the bundle, the assembly being placed horizontally in the extension of said waiting position and the bundle of rods of the assembly is extracted in order to bring it directly into said waiting position, the horizontal and vertical combs being put into place corresponding to the displacements of the bundle towards said position.

According to another feature of the invention, in order to facilitate the introduction of the rods into the case, at the entrance to the latter is previously positioned a base in which are located the ends of the rods turned towards the case, said base being able to slide in the case with the rods during the introduction of the latter.

The process according to the invention also makes it possible to transfer the rods into cases which can have different sections, e.g. triangular, hexagonal or trapezoidal.

For this purpose, before introducing the rods into the cassette recesses, the face of at least certain of the recesses is moved upwards, so as to reduce the number of rods which can be received in each recess, whose base is displaced. Moreover, if required by the shape of the case, after introducing the rods into the cassette recesses, there is a downwards displacement of the base of at least certain of the recesses, whose base has been previously upwards, so that the rods contained in these recesses are at the same level as that part of the case into which they have to be introduced.

The invention also relates to an installation for placing in a case a bundle of rods arranged in n parallel rows of at least r rods, according to a square pitch lattice in a nuclear fuel assembly, wherein it comprises means for maintaining the bundle of rods horizontally in accordance with said lattice in a waiting position above a cassette having p recesses separated by partitions, p being an integer at least equal to h, in such a way that each row of rods is positioned above a cassette recess, means for introducing the rods into the cassette recesses and means for simultaneously pushing all the rods contained in the cassette so as to introduce them into a case positioned horizontally in the extension of the cassette, via a transformation member interposed between cassette and case and whose width decreases progressively from the cassette towards the case by a value equal to the cumulative thickness of the cassette partitions.

According to a preferred embodiment of the invention, the means for introducing the rods into the cassette recesses comprise at least two horizontal support members extending perpendicularly with respect to the rods and on which the latter can rest by gravity and means for displacing said member vertically between a top position in which said members are located above the cassette and a bottom position in which said members are located below the base of the recesses in vertical notches formed in the cassette to the right of the support members.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 2:
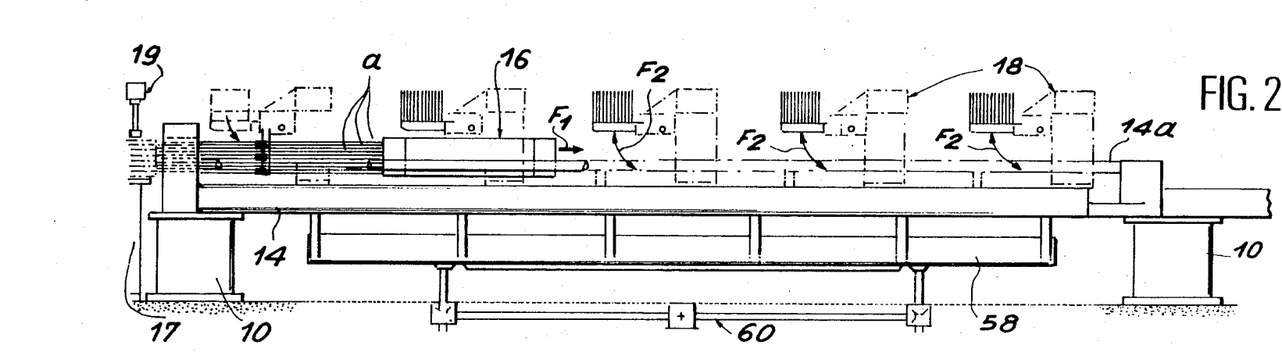
FIG. 2, a side view diagrammatically illustrating the part of the installation according to the invention making it possible to extract the bundle of rods from the assembly and bring it into the waiting position above the cassette.
Figure 3:
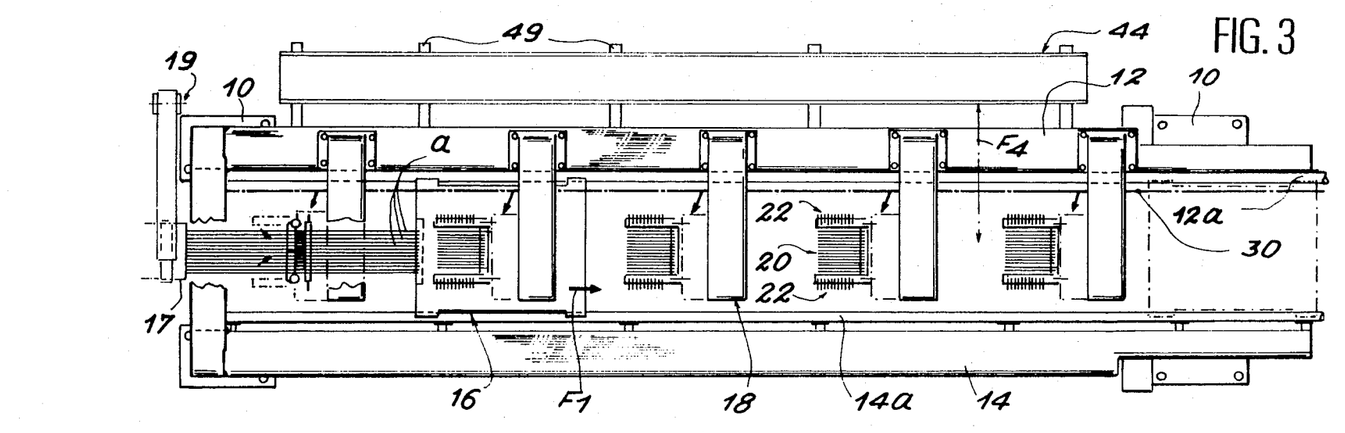
FIG. 3, a plan view of the part of the installation shown in FIG. 2.
Figure 4:
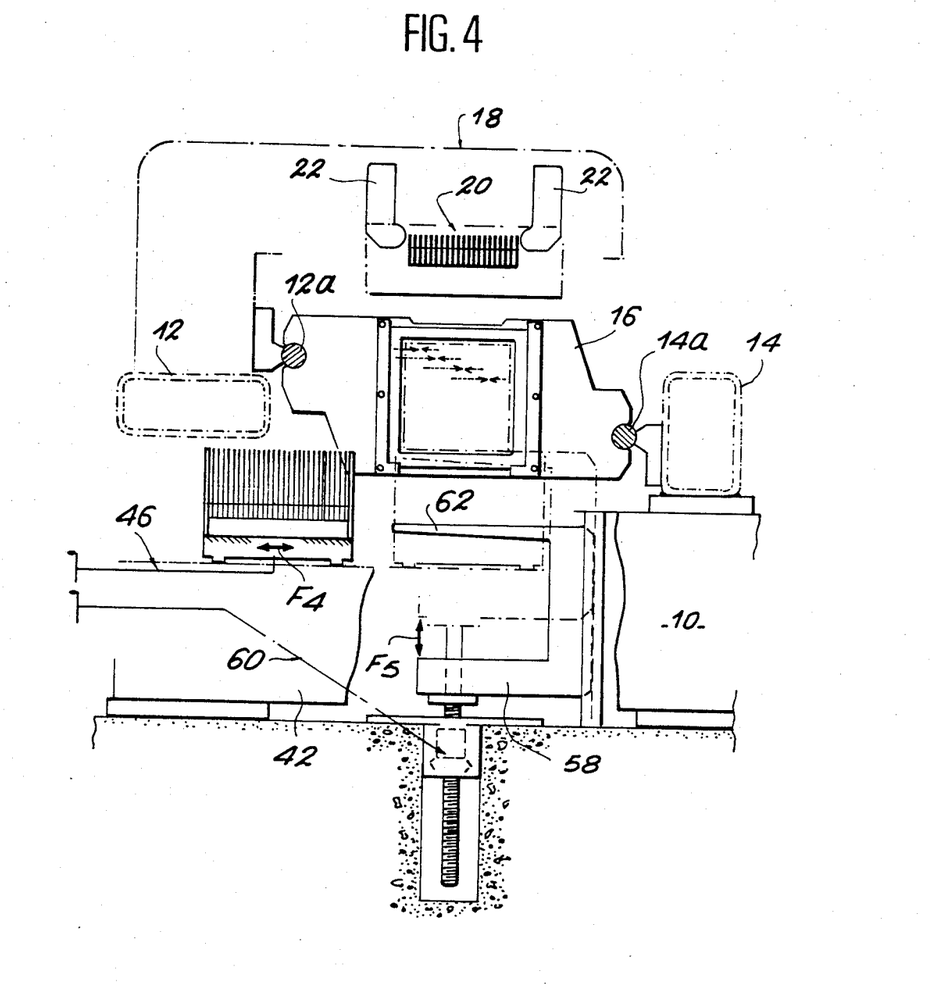
FIG. 4, a larger scale end view very diagrammatically and part sectionally showing the part of the installation illustrated by FIGS. 2 and 3.

FIGS. 2 to 4 show the installation according to the invention comprising two plates 10 supporting at their ends two horizontal, parallel beams 12, 14.

Figure 5:
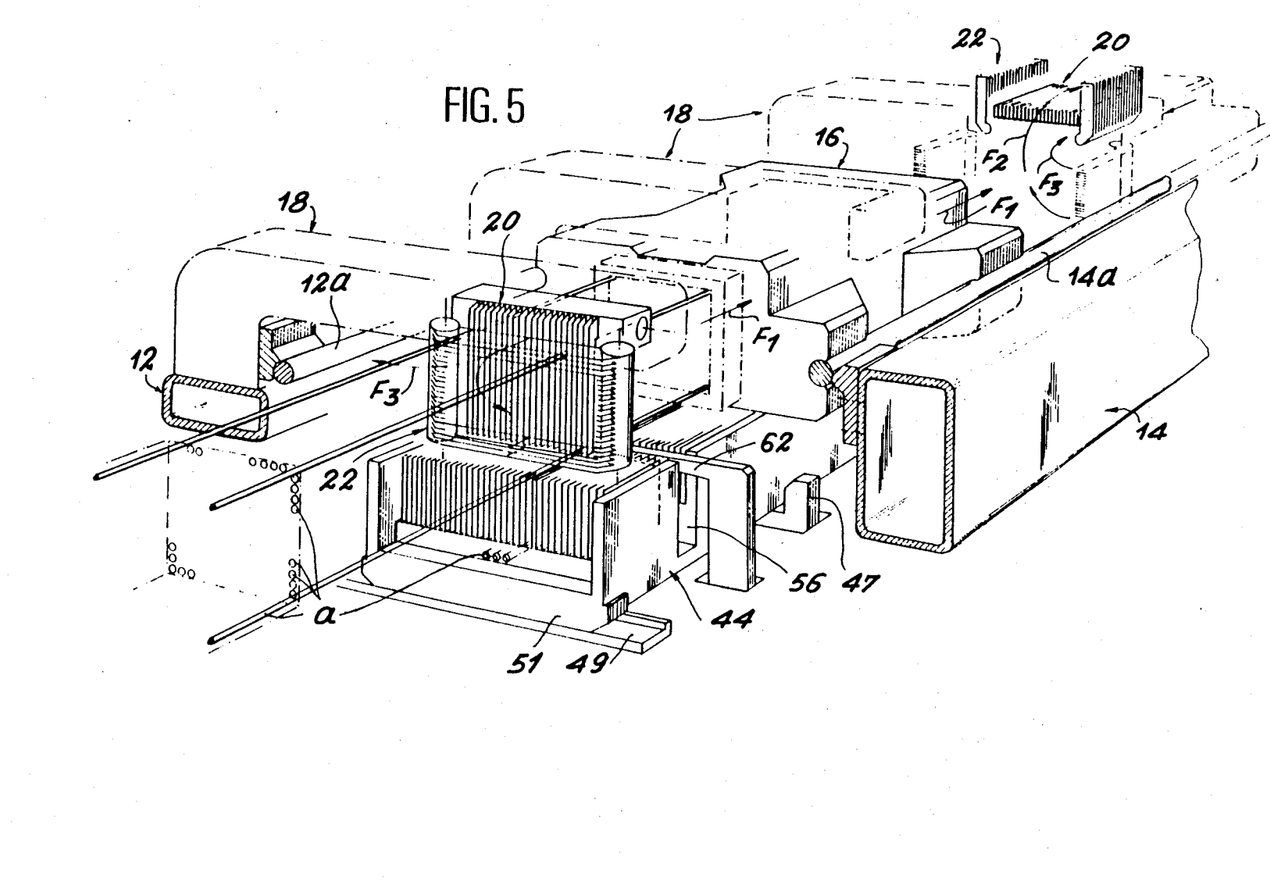
FIG. 5, a part sectional, perspective view of the part of the installation shown in FIGS. 2 to 4.

As is more specifically illustrated in FIGS. 4 and 5, beams 12 and 14 carry facing guide rails 12a, 14a, which are horizontal and parallel and on which can slide a carriage 16. The latter carries a gripping device making it possible to simultaneously grip by their end, the rods a of a bundle of rods contained in a nuclear fuel assembly, like that shown in FIG. 1. This gripping device can in particular be constructed in the manner described and claimed in French patent application No. 85 17779, filed on Dec. 2, 1985 by COGEMA (Compagnie Generale des Matieres Nucleaires).

In order to permit the extraction of the bundle of rods a of a nuclear fuel assembly by means of the gripping device supported by carraige 16, a bed 17 is placed in the extension of horizontal beams 12, 14. This bed is equipped with means 19 for clamping the framework assembly, from which has previously been removed the upper fitting d and the contiguous grid c (FIG. 1).

As the corresponding end of the assembly has been placed on bed 17 in the vicinity of the left-hand part of the installation shown in FIGS. 2 and 3, by bringing carriage 16 to this location, it is possible to grip the rods a of the assembly by the end thereof using the gripping device carried by the carriage. As the framework of the assembly is clamped to its bed, the displacement of the carriage to the right, on considering FIGS. 2 and 3 (arrow $F_1$) has the effect of extracting the bundle of rods a and bringing it into a waiting position, where it is entirely extracted from the assembly and is positioned horizontally approximately between plates 10 and beams 12, 14.

In order to maintain the rods of the bundle in accordance with the square pitch lattice in which they are located within the assembly during the extraction thereof, horizontal and vertical combs or rakes are provided over the entire length of beams 12, 14 and are controlled so as to be brought into place automatically following the passage of carriage 16.

In the embodiment shown in FIGS. 2 and 3, the installation comprises two sets of horizontal combs 22 and one set of vertical combs 20. Each of these two sets of combs comprises 10 combs, one comb of each set being carried by a bracket 18. Each of the brackets 18 is fixed to beam 12 and comprises an overhanging horizontal part positioned above the path followed by carriage 16.

Figure 6:
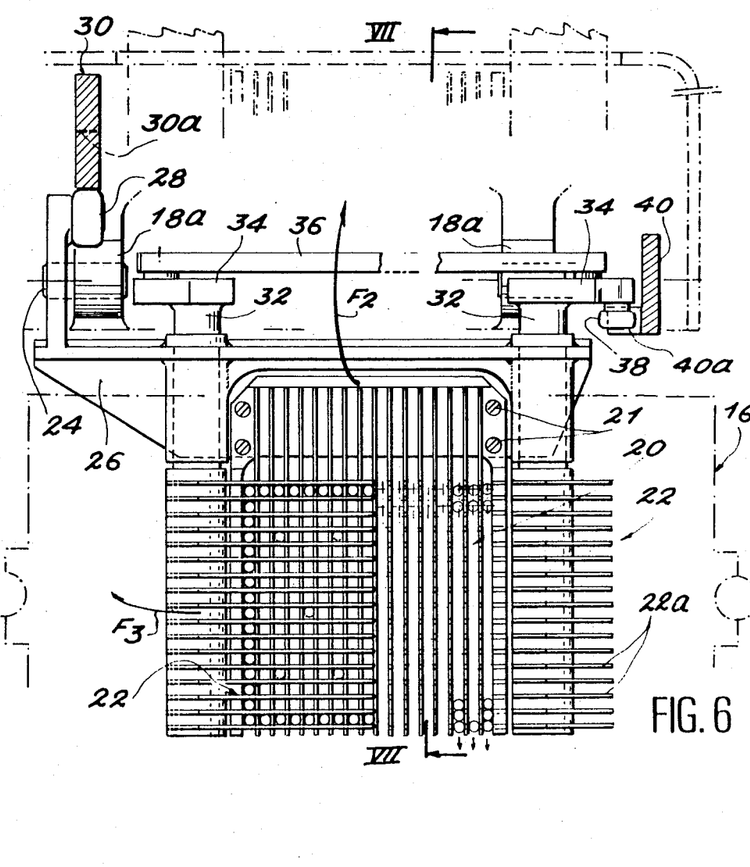
FIG. 6, a front view showing on a larger scale one of the assemblies of horizontal and vertical combs ensuring the maintenance of the bundle of rods in the waiting position in the part of the installation shown in FIGS. 2 to 5.
Figure 7:
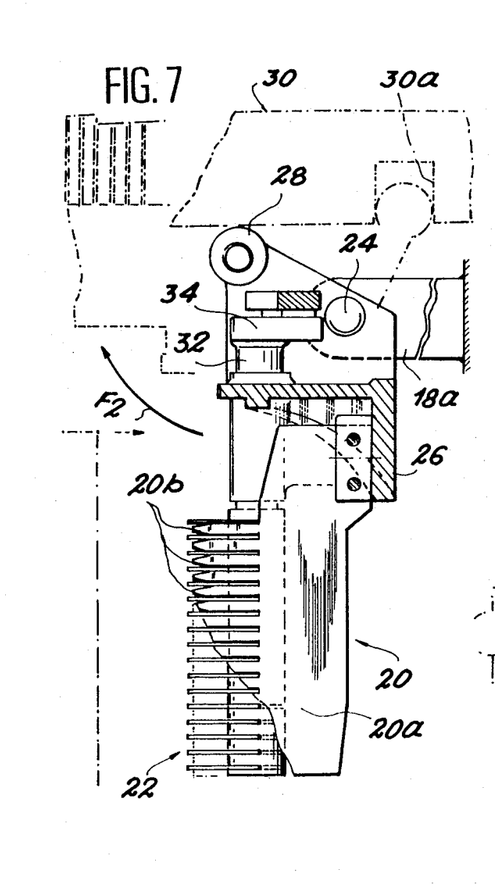
FIG. 7, a side view of the combs shown in FIG. 6, in section along line VII—VII of FIG. 6.

As is more specifically illustrated in FIGS. 6 and 7, each of the brackets 18 supports in its part overhanging the group of rods, a vertical comb 20 and two horizontal combs 22.

More specifically, the horizontal part of each of the brackets 18 comprises two clips 18a on which a support 26 is pivotably received by means of two aligned shafts 24. The pivoting axis of support 26 is horizontal and oriented in a transverse direction, orthogonal to the displacement direction of carriage 16 defined by rails 12a, 14a and consequently the direction of rods a.

As shown respectively in continuous and broken line form in FIG. 7, support 26 can occupy two positions corresponding to the putting into place of the combs between the rods of the bundle and the retraction of said combs. These two positions of support 26 are determined by the cooperation of a horizontally axed roller 28, carried by support 26 with a horizontally notched bar 30 carried by brackets 18 and which extends parallel to rails 12a, 14a over the entire length of the means.

When roller 28 is in contact with the lower edge of bar 30, as shown in continuous line form in FIGS. 6 and 7, the teeth 20a of vertical comb 20, fixed to support 26 e.g. by screws 21, project vertically downwards between the rods a of the bundle.

However, when roller 28 is located in a notch 30a formed on the lower edge of bar 30, support 26 pivots in the direction of arrow $F_2$, so that the teeth 20a of vertical comb 20 are oriented horizontally above the path followed by carriage 16, thus permitting the passage thereof.

It is readily apparent that by providing over the entire length of bar 30, level with each of the brackets 18, a notch 30a of an appropriate length, a translation of said notched bar controlled simultaneously with the displacement of carriage 16 has the effect of successively putting into place each of the sets of vertical combs 20 following the passage of carriage 16. The control of the displacement of bar 30 can be carried out by any not shown means, which simultaneously ensures the control of the displacement of carriage 16 along rails 12a, 14a.

Each of the horizontal combs 22 is pivotably mounted on support 26 by a shaft 32 oriented perpendicular to the teeth 20a of the corresponding vertical comb 20, the shafts 32 being located on either side of said vertical comb. Above support 26, each of the shafts 32 carries a crank 34. The two cranks 34 are interconnected by a connecting rod 36, whose ends are articulated on each of the cranks by shafts parallel to shafts 32.

Moreover, one of the cranks 34 supports a roller 38, whose shaft is parallel to shafts 32. Roller 36 is in contact with the inner face of a second notched bar 40 supported by brackets 18 and which extends parallel to rails 12a, 14a over the entire length of the means, like bar 30.

As the two horizontal combs 22 and their control mechanism constituted by cranks 34, connecting rod 36 and roller 38 are carried by support 26, which tilts about the horizontal axis materialized by shafts 24, in accordance with the position occupied by bar 30, a distinction can be made between two cases when analyzing the control of combs 22.

When the vertical comb 20 occupies its retracted position shown in broken line form in FIGS. 6 and 7, combs 22 must also be retracted, as shown in the right-hand half of fig 6. As is shown in broken line form in FIG. 6, this result is obtained by the fact that roller 38, whose axis is then substantially horizontal, is in contact with the upper, reduced thickness part of the bar 40.

When the tilting of support 26 in the opposite direction to arrow $F_2$ occurs automatically during the advance of carriage 16, the position of bar 40 is then such that roller 38 automatically penetrates a notch 40a formed in the lower, thicker part of bar 40. As the latter performs a translation movement proportional to the advance of carriage 16, in the same way as bar 30, when the putting into place of a vertical comb 20 is ended, the corresponding roller 38 leaves its notch 40a. This has the effect of simultaneously pivoting in reverse directions the shafts 32 carrying combs 22 (arrows $F_3$). The teeth 22a of the horizontal combs 22 thus penetrate between the horizontal rows of rods a, as shown in the left-hand half of FIG. 5.

The teeth 20a of vertical combs 20 have a length such that they completely separate the vertical rows of rods a, when said combs are in the working position. However, the length of teeth 22a of each of the combs 22 is such that each of these combs separates only over half of the length thereof the horizontal rows of rods a, when said combs are in the working position.

As is more particularly illustrated in FIG. 7, to facilitate the introduction of the teeth of the horizontal combs 22 between rods a, at least some of the teeth 20a of vertical comb 20 themselves have teeth 20b on the leading edge thereof (when considering the displacement direction of carriage 16). Teeth 22a of vertical combs 22 penetrate slots formed between said teeth 20b.

As a result of the mechanism described with reference to FIGS. 6 and 7, the rods a of the bundle are supported and maintained in accordance with the square pitch lattice previously occupied by them in the nuclear fuel assembly by the three sets of combs 20 and 22. When the rods a have been completely extracted from the assembly (waiting position), the gripping device carried by carriage 16 is released, so that the rods are then only supported by the combs.

As is more specifically illustrated in FIGS. 3 and 4, the installation according to the invention also comprises a bed 42 extending between plates 10 and supporting a cassette 44.

With said plate 42 is associated a mechanism shown diagrammatically at 46 in FIG. 4 and which makes it possible to transversely displace cassette 44 in a horizontal direction orthogonal to the direction of rails 12a, 14a. More specifically, mechanism 46 makes it possible to displace the cassette between a loading position, in which the latter is located vertically below the bundle of rods in the waiting position and an unloading position in which the cassette is laterally displaced with respect to that part of the installation shown in FIGS. 2 to 4 (arrow $F_4$ in FIG. 3).

As is more specifically shown in FIG. 5, mechanism 46 act on mobile cradles 47 on which rest cassette 44. The cassette is guided by rails 49 mounted on bed 42 and in which are received clips 51 formed on the cassette.

Cassette 44 extends over a length slightly less than that of rods a. As is more specifically illustrated in figs 8 and 9, it comprises a horizontal base 48, two vertical, lateral partitions 50 and a certain number of vertical, intermediate partitions 52 defining recesses 54 between them. The width of each of the recesses 54 formed in this way slightly exceeds the diameter of a rod a, whilst the height of said recesses is such that it can receive a give number of stacked rods, whereby said number is below or at the most equal to the minimum number of rods contained in each of the vertical rows of the bundle.

Figure 8:
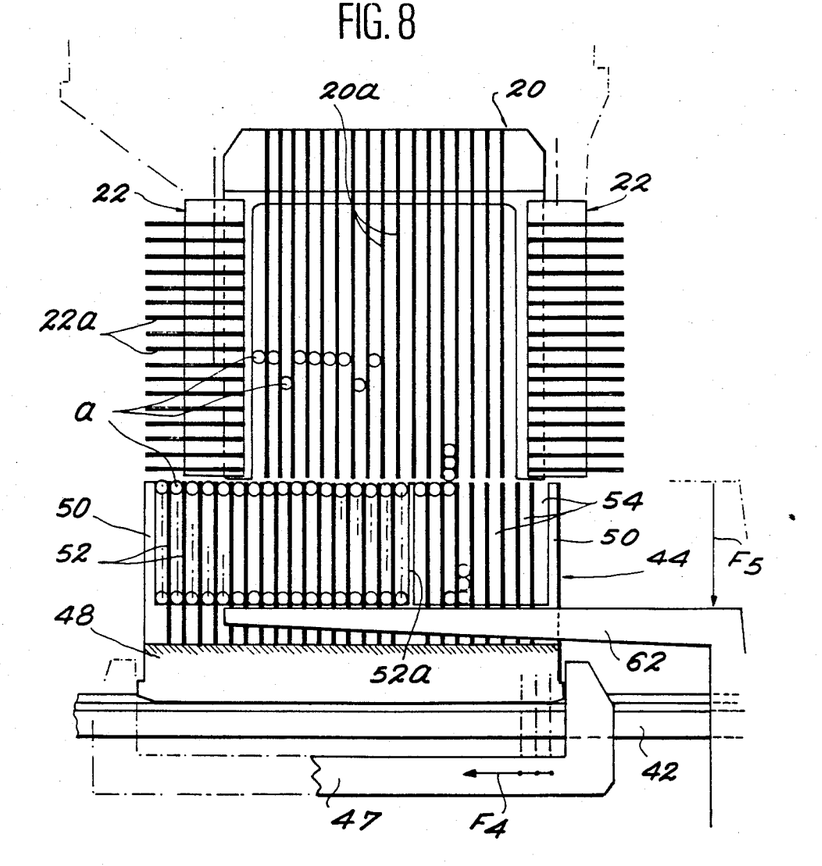
FIG. 8, a diagrammatic cross-sectional view of the part of the installation shown in FIGS. 2 to 5, more specifically illustrating the positions occupied by the combs during cassette filling.

As illustrated more particularly in FIG. 8, the width of cassette 44 exceeds the width of the bundle in the waiting position. The recesses 54 defined by intermediate partitions 52 comprise a first series of recesses located in the left-hand part of cassette 44 in FIG. 8, the number of said recesses being identical to that of the vertical rows of rods a in the waiting position. Cassette 44 also comprises a certain number of supplementary recesses 54 (9 in FIG. 8), which serve to receive excess rods which cannot be located in the first series of recesses 54. To avoid any deflection of the partitions during the filling of the first series of recesses 54, said two series of recesses are separated by a thicker partition 52a.

For a reason which will become apparent hereinafter, in given locations of its length, cassette 44 is provided with transverse notches 56 (FIG. 9) extending into lateral partitions 50, intermediate partitions 52, 52a and partly into the base 48 of the cassette.

For completing the installation making it possible to introduce into cassette 44 the bundle of rods a in the waiting position, FIGS. 2 and 4 show that said installation also comprises a horizontal plate 58 located below the rod bundle in the waiting position and which is vertically movable within bed 42 supporting cassette 44. The control of the vertical displacement of plate 58 (arrow $F_5$ in FIG. 4) is e.g. realised by a screw—nut mechanism with angle gearboxes designated by reference 60 in FIGS. 2 and 4.

Figure 9:
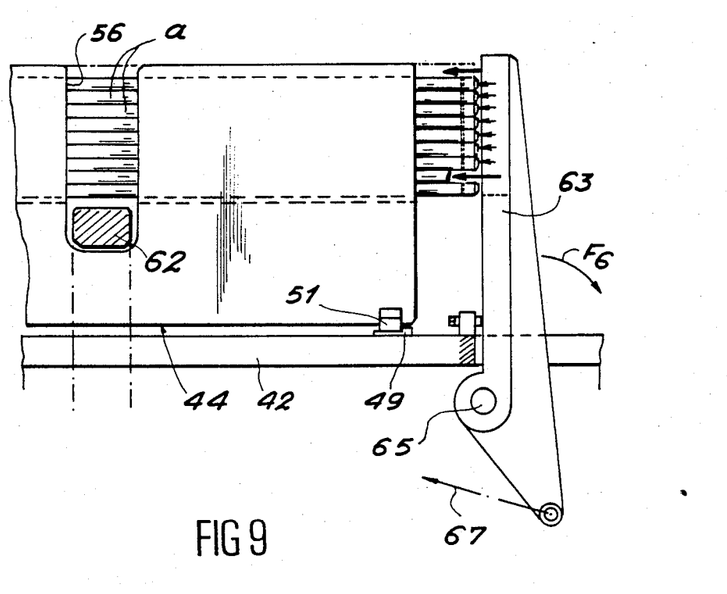
FIG. 9, a side view showing one end of the cassette and the means for controlling the number of rods contained therein.

Plate 58 carries a certain number of horizontal support bars 62 disposed facing the cassette notches 56, so as to be able to penetrate said notches in the manner illustrated more particularly in FIG. 5, 8 and 9.

When it is wished to fill cassette 44 with a group of rods maintained in the waiting position by combs 20, 22, cassette 44 is brought below said bundle, in such a way that each of the vertical rows of rods is vertically aligned with one of the recesses 54 located to the left of partition 52a in FIG. 8. Plate 58 is then brought into the top position with the aid of mechanism 60, so that the support bars 62 are located immediately below the bundle of rods.

Firstly, the horizontal combs 22 are brought into the retracted position by an appropriate translation of notched bar 40. In each of the vertical rows of rods defined by the teeth 20a of the vertical combs remaining in place, the rods are then stacked on top of one another whilst bearing against the support bars 62.

Secondly, said support bars are slowly lowered under the action of mechanism 60 (arrow $F_5$ in FIGS. 4 and 8). This lowering of support bars 62 continues until the lower rod of each of the rows is located in the bottom of the corresponding recess 54. The recesses 54 located to the left of the intermediate partition 52a in FIG. 8 are then filled with rods.

In the represented embodiment, the number of rods contained in each of the recesses 54 is less than the number of rods initially located in each of the vertical rows of the bundle. Consequently, a certain number of rods is then located above the cassette in the different vertical rows defined by the teeth 20a of vertical combs 20.

In order to fill with rods the remaining recesses 54 of cassette 44 there is then a stepwise displacement to the left of cassette 44, in considering FIG. 8, using mechanism 46 (arrow $F_4$ in FIG. 8). The advance pitch or spacing of the cassette in accordance with arrow $F_4$ is qual to the pitch or spacing of the lattice separating the vertical rows of rods (a). Thus, for each advance of the cassette, there is a new recess 54 below each vertical column of rods. In this way, the recesses 54 located to the right of partition 52a in FIG. 8 are filled one by one with the rods remaining between the teeth of comb 20, said rods dropping by gravity into said recess recesses 54.

The number of recesses 54 is determined as a function of the number of rods contained in each bundle, so that all the rods of a bundle from a nuclear fuel assembly can be housed in cassette 44.

As is very diagrammatically illustrated in FIG. 9, when all the rods a of an assembly have been transferred into cassette 44, the ends of the rods project by the open ends of the latter. Knowing the number of rods initially contained in an assembly, it is then possible to check that no rod has been jammed in the combs, by counting the rods housed in the cassette at one of the ends thereof or, preferably, at either end.

For this purpose, use is made of random counting means carried by a plate 63. This plate is e.g. articulated to bed 42 about a shaft 65, so as to be normally retracted (arrow $F_6$) under the action of a control device, such as a jack, diagrammatically indicated by arrow 67 in FIG. 9.

When this control has taken place, mechanism 46 is continuously actuated in the direction of arrow $F_4$ (FIG. 9) to bring the cassette into a discharge position in which it is laterally displaced with respect to the aforementioned part of the installation. This position is shown in continuous line form in FIG. 3.

Figure 10:
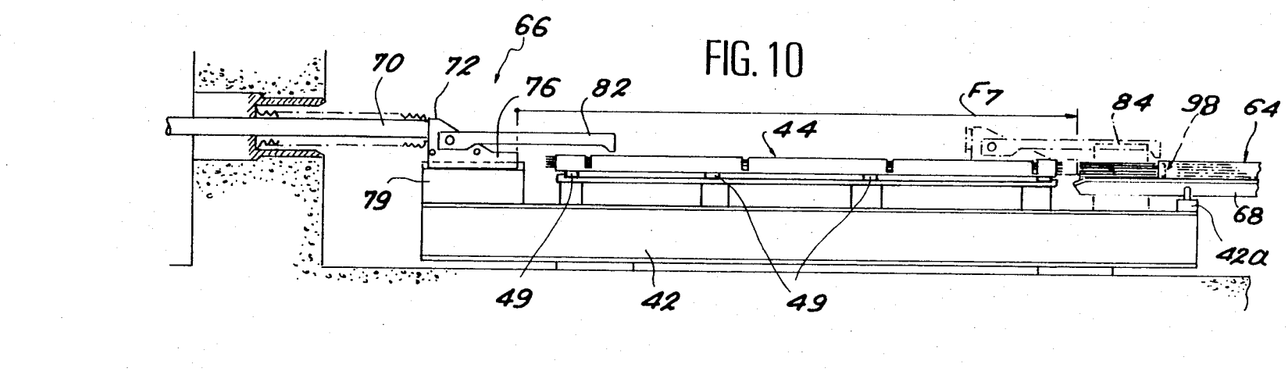
FIG. 10, a diagrammatic side view showing the part of the installation making it possible to transfer the rods from the cassette into the case.

FIG. 10 shows another part of the installation according to the invention making it possible to transfer rods a from cassette 44 into the their final storage case 64.

More specifically, FIG. 10 shows that when case 64 filled with rods is located in the lateral discharge position diagrammatically represented in FIG. 3, one of the ends of case 64 is located in the extension of a pushing means 66, whereas the other end of the cassette is located in the extension of a rocker 68 carrying case 64.

Obviously, the dimensions of case 64, which has a square or rectangular section, are adapted in such a way that all the rods contained in the different recesses of cassette 44 can be introduced into said case after moving together the different vertical rows of rods contained in each of the cassette recesses. More specifically, the dimensions of case 64 are generally determined beforehand as a function of the subsequent storage conditions and it is cassette 44 which is dimensioned so as to permit this transfer. In particular, the internal height of case 64 slightly exceeds the height of the recesses of cassette 44 and the width of case 64 slightly exceeds the cumulative width of all the cassette recesses.

Figure 12:
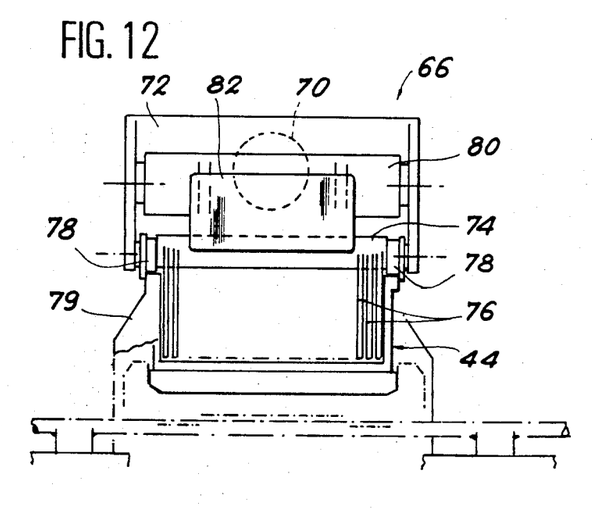
FIG. 12, a larger scale front view diagrammatically showing the pushing means used in the part of the installation shown in FIGS. 10 and 11.

As is more specifically illustrated in FIGS. 10 and 12, the pushing means 66 comprises a horizontal push rod 70, whose axis is parallel to the axes of the rods contained in the cassette. At its end, rod 70 carries a support 72 on which is mounted, by means of a horizontal shaft 74 orthogonal to the rod axis, a series of pushing means 76. The number of the latter is identical to the number of cassette recesses 54. Each pushing means is constituted by a vertical plate having a slightly smaller width than the width of a recess 54 and whose height is at least equal to the height of such a recess.

When the cassette is in the discharge position, each of the pushing means 76 is located in the extension of one of the recesses 54, so that the actuation of the push 70 in the direction of arrow $F_7$ (FIG. 10) has the effect of simultaneously pushing all the rods contained in cassette 44 towards case 64. Rod 70 can be actuated by any appropriate means, such as a not shown jack. The guidance of support 72 with respect to cassette 44 is obtained through two rollers 78 carried by shaft 74 and successively rolling on a guide member 79 carried by bed 42 and then on the side walls of cassette 44.

Above the pushing means 76, support 72 carries about a shaft 80 parallel to shaft 74 a pushing means 82, whose planar, rectangular end has dimensions slightly larger than the sectional dimensions of case 64. Pushing means 82 simultaneously pushes all the rods at the end of the operation of placing in the case, as will be shown hereinafter (arrow $F_8$ in FIG. 11).

Figure 13:
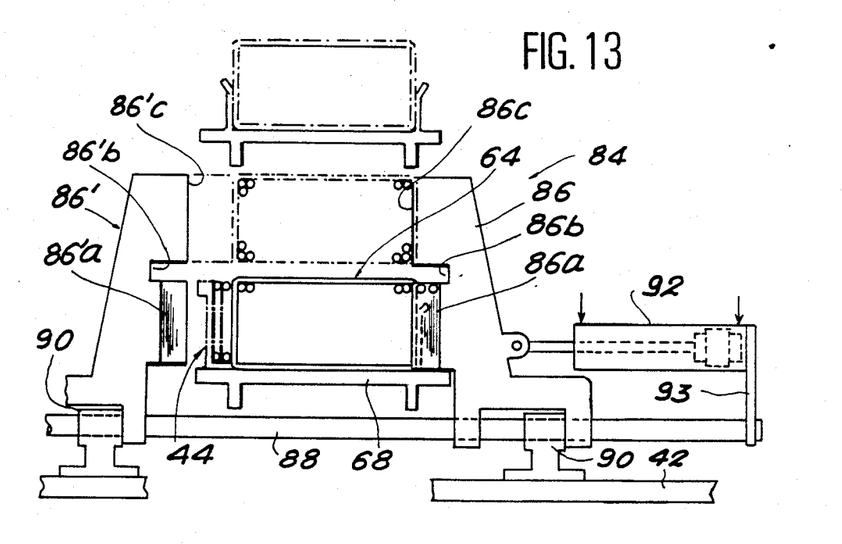
FIG. 13, a front view of the transformation member interposed between the cassette and the case in the installation shown in FIGS. 10 and 11.

In order to move together the different vertical rows of rods contained in the cassette and thus permit the introduction thereof into case 64, between the end of cassette 44 opposite to pushing means 66 and case 64 is placed a transformation member 84 shown in greater detail in FIG. 13. Transformation member 84 comprises two lateral jaws 86, 86', mounted on two horizontal columns 88 extending transversely below the end of rocker 68 carrying case 64 in a direction orthogonal to the axes of rods a.

More specifically jaw 86' is integral with columns 88, whereas jaw 86 is slidingly received on these columns. Columns 88 are themselves slidingly mounted by bearings 90 on bed 42, which also support the cassette 44. The body of a double action jack 92 is joined by a plate 93 to the ends of columns 88 located on the side of jaw 86. The rods of this same jack is articulated on jaw 86, so that actuation in one or other direction of the double action jack 92 makes it possible either to move together jaws 86, 86' (as illustrated in the right-hand part of FIG. 13) or move them apart (as illustrated in the left-hand half of FIG. 13). In both cases the jaws move successively, the displacement of the second jaw taking place following the abutment of the first jaw on a bearing 90.

In the lower part thereof and over a height corresponding to the height of case 64 and cassette 44, jaws 86, 86' have two facing, planar, vertical surfaces $86a$, $86'a$, inclined with respect to the direction of the rods contained in the cassette. This inclination is such that when the jaws 86 are moved together, the spacing between surfaces $86a$ and $86'a$ on the side of cassette 44 is substantially equal to the width of said cassette, whereas the spacing between surfaces $86a$, $86'a$ on the side of case 64 is substantially equal to the width of case 64. Jaws 86, 86' are hollowed out below surfaces $86a$, $86'a$ to permit the passage of the end of rocker 68.

Above surfaces $86a$, $86'a$, jaws 86, 86' also have a notch $86b$, $86'b$ able to receive the end of rocker 68. Above said notch, jaws 86, 86' again have two facing, planar, vertical surfaces $86c$, $86'c$, said surfaces being parallel to one another and to the axes of the rods. When the jaws are moved together, the spacing between these surfaces corresponds to the width of case 64, said surfaces $86c$, $86'c$ extending over a height substantially equal to that of the case.

Figure 11:
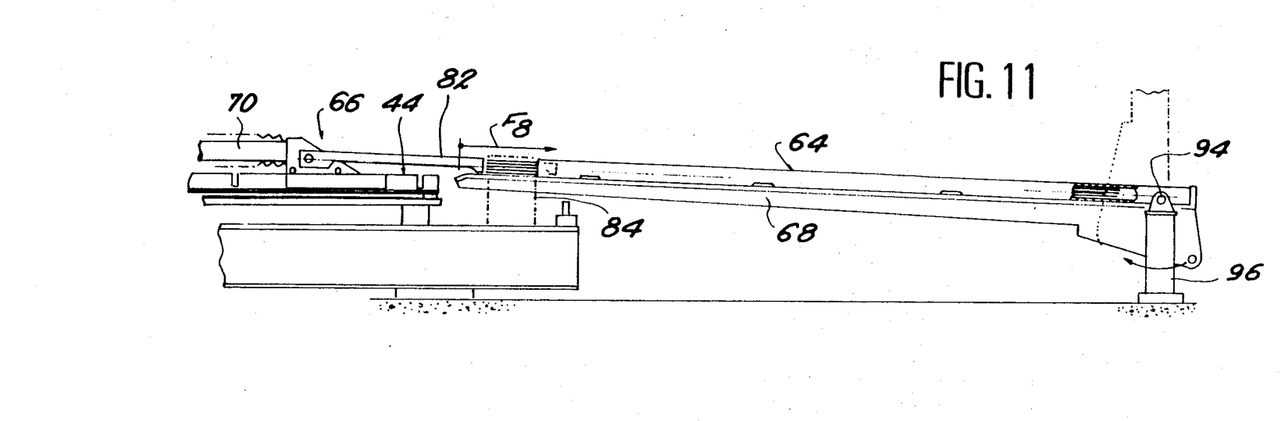
FIG. 11, a view similar to FIG. 10 showing the same part of the installation for introducing the rods into the case.

Finally and as illustrated in FIG. 11, At its end opposite to member 84, rocker 86 is articulated by a shaft 94 on a member 96 resting on the ground.

Firstly, rocker 68 is brought into a horizontal position, so that case 64 is located directly in the extension of cassette 44. In this position, shown in FIG. 10, the end of the rocker rests on a support member $42a$ mounted on bed 42.

Following this putting into place of the rocker 68 authorized by a moving apart of the jaws of member 84, said jaws are moved together again by acting on jack 92, so that the spacing between surfaces $86a$ and $86'a$ on entry and exit respectively correspond to the width of the cassette and the width of the case.

The transfer of the rods from the cassette into the case can be carried out by actuating rod 70. Thus, pushing means 76 are brought into contact with the ends of the rods opposite to case 64. During the displacement to the right of the series of pushing means 76 (arrow $F_7$), all the rods are simultaneously introduced into case 64 through member 84, which moves together the vertical rows of rods.

Preferably, care is taken beforehand to place a base 98 (FIG. 10) at the entrance to case 64 and in it are located the corresponding ends of the rods, said base sliding within the case as the rods are introduced.

When the pushing means 66 arrives in the position shown in broken line form in FIG. 9, in which the pushing means 76 are flush with transition member 84, it is no longer possible to continue the introduction with the aid of pushing means 76.

As is more particularly illustrated in FIG. 11, rocker 68 is then slightly inclined in order to bring it level with notches 86b, 86'b on the jaws of member 84, after moving said jaws apart. Jaws 86 are then brought together again, in order to immobilize rocker 68 in said position. This also has the effect of laterally bringing together the ends of the rods still located outside the case between the parallel surfaces 86b, whose spacing then corresponds to the internal width of case 64.

As can be seen in FIG. 11, in this position of rocker 68, the push rod 82 of pushing means 66 is then directly located in the extension of the ends of the rods. A further thrust exerted on means 66 via rod 70 consequently has the effect of terminating the introduction of the rods into case 64.

At this stage, rocker 68 can e.g. be brought into a vertical position, as shown in broken line form in FIG. 11, so as to prepare the subsequent passage of case 64 to its storage pool.

As a result of the installation described in greater detail hereinbefore, the placing in the case of the rods takes place in two stages, a first stage consisting of moving together the rods in a first direction of the square pitch lattice formed by them. This first stage is made possible by the use of an intermediate cassette. During a second stage, the rods are moved together in accordance with a second direction of the square pitch lattice initially formed by the bundle by simultaneously transferring all the rods from the cassette into the case.

As a result of this original idea, the placing in the case of the rods can be carried out under all conditions without any risk of said rods jamming, which was not possible with the prior art procedures.

The invention is not limited to the preferred embodiment described in exemplified manner hereinbefore. Thus, if it is not possible to lower the rods into the cassette by gravity when rods are particularly deformed, it is possible to add to the described installation a thrust system facilitating the introduction of the rods into the cassette. In addition, different parts of the installation, such as the pushing means 66, the comb control mechanism, member 84, as well as the gripping means making it possible to bring the rods into the waiting position above the cassette can be modified without passing beyond the scope of the invention.

Figure 14:
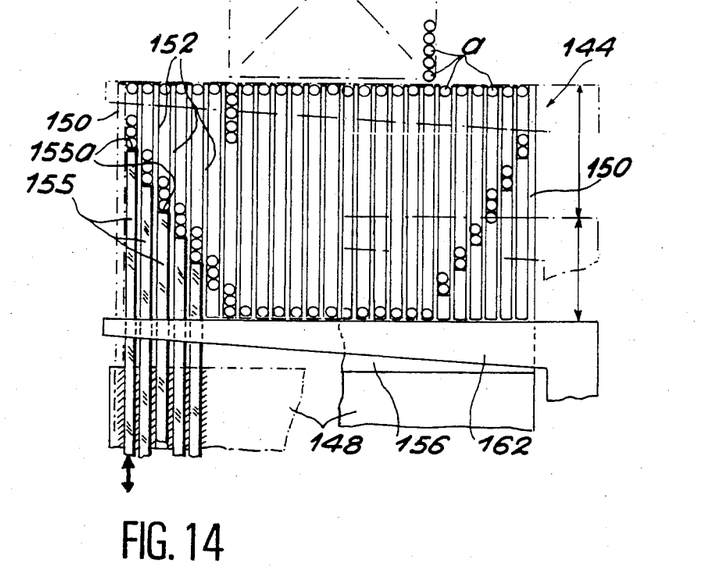
FIG. 14, a view comparable to FIG. 8 illustrating a constructional variant, in which the base of certain of the passages of the cassette is defined by vertically mobile strips.
Figure 15:
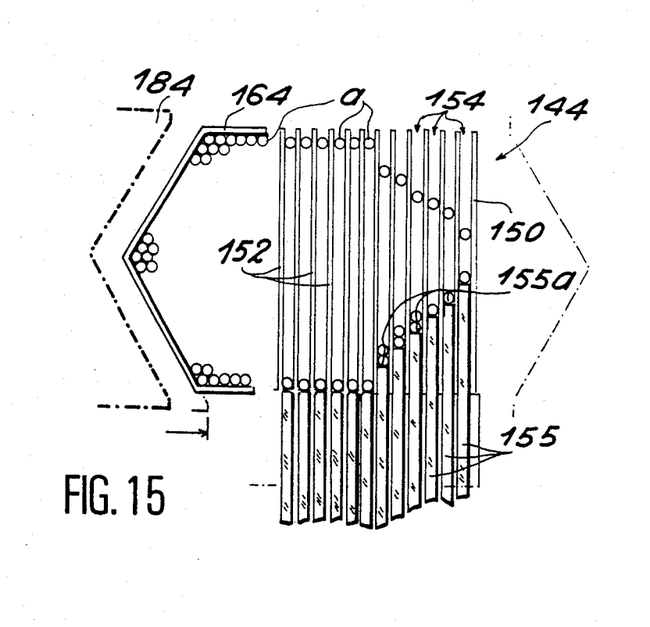
FIG. 15, the displacement of the mobile strips of the cassette of FIG. 14 permitting the introduction of rods into a case having a hexagonal section.
Figure 16:
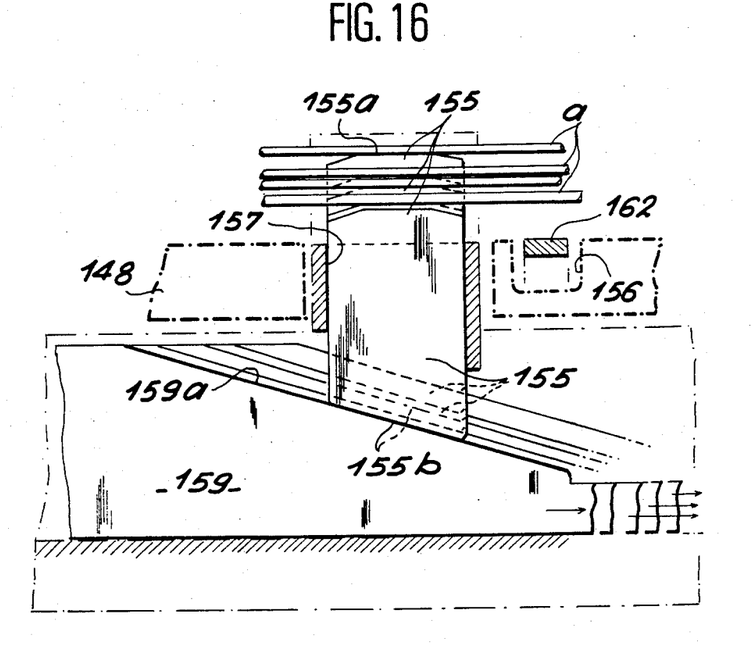
FIG. 16, a diagrammatic side view illustrating the control of the displacement of the mobile strips of the cassette of FIG. 14.

Finally and as illustrated in exemplified manner in FIGS. 14 to 16, slight modifications made to the installation described hereinbefore make it possible to introduce rods into a case having a non-rectangular cross-section, e.g. trapezoidal, triangular or hexagonal.

More specifically, FIGS. 14 to 16 illustrate a constructional variant, in which the rods are introduced into a hexagonal case. Elements identical to those of the installation described hereinbefore are given the same reference numerals, increased by 100.

All that part of the installation making it possible to bring the bundle of rods a above cassette 44 remains unchanged. However, the cassette is modified in the manner illustrated in FIGS. 14 and 16.

Thus, although the cassette still has a rectangular vertical section and a horizontal base 148 carrying two vertical, lateral partitions 150 and intermediate partitions 152 parallel to partitions 150 and defining recesses 154 having a width slightly greater than the diameter of rods a, the base of at least part of the recesses 154 is designed in such a way that it can be vertically displaced. As illustrated by FIGS. 14, and 16, this result is obtained by strips 155 of different heights placed in each of the recesses 154 and whereof the upper edge 155a defines the bottom of these recesses.

As hereinbefore, the lowering of rods a into recesses 154 is controlled by support means 162, which are vertically mobile in notches 156 formed in the cassette. Thus, these strips 155 do not cover the entire width of the cassette, so that the bottom of each recess in reality comprises several strips 155 regularly distributed over its entire length, so as to prevent bending of the rods between the strips.

As is show in FIG. 16, each of the strips 155 is mounted in sliding manner in a vertical direction in a passage 157 formed for this purpose in the bottom 148 of the cassette. Moreover, each strip 155 has an inclined lower edge 155b forming a ramp with cooperates a complementary ramp 159a formed on a member 159 mobile along the longitudinal axis of the cassette in the bottom 148 thereof. More specifically, each of the strips 155 forming the bottom of one of the recesses 154 is controlled by an independent member 159.

In this way, it is clear that by displacing members 159 in one or other direction, it is possible to control the rise or fall of the corresponding strips 155 and consequently the adjustment of the height of the bottom of each cassette recess 154.

FIG. 14 shows that it is possible in this way to position the bottom of the recesses 154 closest to the cassette edges, in such a way that the height of the bottom of these recesses increases progressively towards the outside of the cassette. This position is adopted before the loading of the cassette 144, the loading process otherwise remaining identical to that described hereinbefore and in this way the cassette is filled in a section approximately shaped like an isosceles trapezium.

When loading is ended and as illustrated in the right-hand half of FIG. 15, the strip 155 closest to the cassette edges are lowered by a half-height with respect to the relative height which would separate them from the bottoms of the steepest central recesses during the loading of the cassette. Thus, the bundle of rods a present in the cassette is given a deformed hexagonal cross-section, whose width exceeds the height by a value approximately equal to the cumulative width of the intermediate partitions 152.

By placing the cassette in the extension of a case 164 having a hexagonal section and by interposing an adapted transformation member (diagrammatically indicated at 184), as illustrated in the left-hand half of FIG. 15, it is possible to load the case in the manner described hereinbefore.

As a function of the shape of the case to be loaded, it is clear that the lowering stage for strips 155 following the loading of the cassettes can be eliminated. Obviously, cassettes having strips 155 with different characteristics can be used as a function of the cross-sectional shape of the case to be loaded.

What is claimed is:

1. A process for placing in a case a bundle of rods arranged in n parallel rows of at least r rods, in accordance with a square pitch lattice in a nuclear fuel assembly, wherein it comprises placing the bundle of rods horizontally in accordance with said lattice in a waiting position above a cassette having p recesses separated by partitions, p being an integer at least equal to n, so that each row of rods is located above a recess in the cassette, lowering the rods into the cassette recesses, placing the cassette in the horizontal extension of a case, by interposing between cassette and case a transformation member, whose width decreases progressively from cassette to case by a value equal to the cumulative thickness of the cassette partitions and transferring the rods from the cassette into the case through the transformation member by simultaneously pushing all the rods.

2. A process according to claim 1, wherein the number of rods in certain of the rows exceeds r, so that use is made of a cassette whereof each recess can contain at the most s rods, s being and integer at the most equal to r and comprising a number p of recesses exceeding n and such that the product p.s is at least equal to the number of rods in the bundle and wherein, after lowering s rods of each row into each of the n recesses located below the n rows of rods, there is a relative horizontal displacement perpendicular to the rods between the cassette and the rods of the bundle not introduced into the n aforementioned recesses, called "remaining rods" in order to bring the (p-n) remaining recesses successively below each row of rods and to lower said remaining rods into said (p-n) recesses.

3. A process according to claim 1, wherein the bundle of rods is positioned horizontally in the waiting position, whilst maintaining the rods in accordance with said square pitch lattice by at least one set of horizontal combs and one set of vertical combs and wherein the set of horizontal combs is retracted prior to introducing the rods into the cassette recesses.

4. A process according to claim 3, wherein, prior to placing the bundle of rods horizontally above the cassette, part of the assembly is eliminated in order to free one of the ends of the rods of the bundle, the assembly being placed in the extension of said waiting position and the bundle of rods is extracted from the assembly to bring it directly into said waiting position, the horizontal and vertical combs being put into place as the displacement of the bundle towards this position advances.

5. A process according to claim 1, wherein, prior to introducing the rods into the case, at the entrance of the latter is placed a base, in which are located the ends of the rods turned towards the case, said base being able to slide in the case with th rods during the introduction of the latter.

6. A process according to claim 1, wherein, prior to introducing the rods into the recesses of the cassette, the bottom of at least certain of th recesses is displaced upwards, so as to reduce the number of rods which can be received in each recess, whose bottom has been displaced.

7. A process according to claim 6, wherein, after introducing the rods into the cassette recesses, the bottom of at least some of the recesses whose bottom has been displaced upwards beforehand is displaced downwards, so that the rods contained in these recesses are at the same level as that part of the case in which they are to be introduced.

8. An installation in ocmbination with a case and cassette for placing in the case a bundle of rods arranged in n parallel rows of at least r rods, according to a square pitch lattice in a nuclear fuel assembly, wherein it comprises means for maintaining the bundle of rods horizontally in accordance with said lattice in a waiting position above the cassette having p recesses separated by partitions, p being an integer at least equal to n, in such a way that each row of rods is positioned above a cassette recess, means for lowering the rods into the cassette recesses and means for simultaneously pushing all the rods contained in the cassette so as to introduce them into a case positioned horizontally in the extension of the cassette, via a transformation member interposed between cassette and case and whose width decreases progressively from the cassette towards the case by a value equal to the cumulative thickness of the cassette partitions.

9. An installation according to claim 8, wherein the means for introducing the rods into the cassette recesses comprise at least two horizontal support members extending perpendicularly with respect to the rods and on which the latter can rest by gravity and means for displacing said members vertically between a top position in which said members are located above the cassette and a bottom position in which said members are located below the base of the recesses in vertical notches formed in the cassette to the right of the support members.

10. An installation according to claim 8, wherein the number of rods of certain of the rows exceeds r, the recesses of the cassette have a depth able to house s rods, s being an integer at the most equal to r, the cassette comprising p recesses, p being an integer greater than n, so that the product p.s is at least equal to the number of rods in the bundle and the means for introducing the rods into the recesses comprise means for effecting a relative horizontal displacement perpendicular to the rods between the cassette and said means in order to horizontally maintain the bundle of rods.

11. An installation according to claim 8, wherein the means for maintaining the bundle of rods horizontally comprise at least one set of retractable horizontal combs and one set of retractable vertical combs.

12. An installation according to claim 11, wherein said installation also comprises means for maintaining the assembly horizontally in the extension of the waiting position, means for extracting the bundle of rods from said assembly and for bringing the bundle into the waiting position and means for permitting the automatic putting into place of the combs in proportion to the displacement of the bundle towards said position.

13. An installation according to claim 8, wherein the bottom of at least some of the recesses of the cassette is partly formed on mobile members making it possible to vary the height of these recesses.

14. An installation according to claim 13, wherein means are provided for controlling a vertical displacement of the mobile members.

* * * * *